US008897807B2

(12) United States Patent
Patel et al.

(10) Patent No.: US 8,897,807 B2
(45) Date of Patent: Nov. 25, 2014

(54) USING MOBILE MESSAGING SERVICE MESSAGE(S) AS BEARER FOR LOCATION RELATED COMMUNICATIONS DURING VOICE CALL

(75) Inventors: Biren Patel, San Ramon, CA (US); Shilei Zhang, Pleasant Hill, CA (US)

(73) Assignee: Cellco Partnership, Basking Ridge, NJ (US)

( * ) Notice: Subject to any disclaimer, the term of this patent is extended or adjusted under 35 U.S.C. 154(b) by 402 days.

(21) Appl. No.: 13/296,929

(22) Filed: Nov. 15, 2011

(65) Prior Publication Data

US 2013/0122932 A1 May 16, 2013

(51) Int. Cl.
| *H04W 24/00* | (2009.01) |
| *H04W 4/02* | (2009.01) |
| *H04M 3/42* | (2006.01) |
| *H04W 4/22* | (2009.01) |
| *H04W 88/18* | (2009.01) |
| *H04W 84/12* | (2009.01) |
| *H04M 1/725* | (2006.01) |
| *H04W 4/14* | (2009.01) |

(52) U.S. Cl.
CPC ............ *H04W 4/02* (2013.01); *H04M 3/42348* (2013.01); *H04W 88/184* (2013.01); *H04M 2250/06* (2013.01); *H04M 3/42382* (2013.01); *H04W 4/22* (2013.01); *H04M 2242/30* (2013.01); *H04W 84/12* (2013.01); *H04M 1/72552* (2013.01); *H04W 4/14* (2013.01); *H04M 1/72572* (2013.01)
USPC ...................... 455/456.2; 455/404.2; 455/440; 455/456.1; 455/456.3; 455/456.4; 455/456.6; 455/457

(58) Field of Classification Search
CPC ........... H04W 4/02; H04W 4/22; H04W 4/14; H04W 84/12; H04W 88/184; H04M 3/42348; H04M 3/42382; H04M 2242/30; H04M 2250/06; H04M 1/72552; H04M 1/72572
USPC ............................ 455/404.2, 440, 456.1–457
See application file for complete search history.

(56) References Cited

U.S. PATENT DOCUMENTS

| 6,662,016 | B1 * | 12/2003 | Buckham et al. ............. 455/457 |
| 6,816,735 | B1 * | 11/2004 | Rayburn et al. ............ 455/456.4 |
| 7,215,965 | B2 * | 5/2007 | Fournier et al. ............ 455/456.1 |
| 7,848,767 | B2 * | 12/2010 | McCann et al. .............. 455/466 |
| 7,881,243 | B2 * | 2/2011 | Hardy et al. .................. 370/312 |
| 7,986,656 | B2 * | 7/2011 | Li et al. ......................... 370/328 |

(Continued)

OTHER PUBLICATIONS

"OGC: Open GeoSMS Specification," Edited by Chun-fu Lin et al., Open Geospatial Consortium Inc., Feb. 1, 2010, OGC 09-142r1, Version: 0.2.1, 2009.

*Primary Examiner* — Mehmood B Khan

(57) ABSTRACT

In a mobile communication network that does not support simultaneous data communication during an active voice call of a mobile station, location information of the mobile station is obtained from a positioning server on the mobile communication network using mobile messaging service type messages as a transport bearer between the mobile station and the mobile communication network. A mobile messaging service message from the mobile station includes information regarding one or more nearby WiFi access points and/or cellular base stations detected by the mobile station. The location of the mobile station is determined by the positioning server, and the results are sent to the mobile station via a responsive mobile messaging service message including the determined location, during the active voice call, for use by an application program running on the mobile station.

18 Claims, 5 Drawing Sheets

(56) References Cited

U.S. PATENT DOCUMENTS

| | | | |
|---|---|---|---|
| 8,509,822 B1* | 8/2013 | Hou et al. | 455/466 |
| 2002/0086682 A1* | 7/2002 | Naghian | 455/456 |
| 2005/0162271 A1* | 7/2005 | Leitch | 340/539.13 |
| 2006/0003775 A1* | 1/2006 | Bull et al. | 455/456.1 |
| 2006/0142027 A1* | 6/2006 | Krishnamurthi et al. | 455/457 |
| 2006/0258365 A1* | 11/2006 | Cha et al. | 455/456.1 |
| 2006/0276167 A1* | 12/2006 | Burroughs | 455/404.2 |
| 2006/0293066 A1* | 12/2006 | Edge et al. | 455/456.3 |
| 2007/0057841 A1* | 3/2007 | McBurney et al. | 342/357.15 |
| 2007/0173264 A1* | 7/2007 | Duan | 455/456.1 |
| 2008/0014971 A1* | 1/2008 | Morin et al. | 455/466 |
| 2008/0227465 A1* | 9/2008 | Wachter et al. | 455/456.1 |
| 2008/0254779 A1* | 10/2008 | Hwang et al. | 455/414.4 |
| 2009/0149196 A1* | 6/2009 | Fournier et al. | 455/456.1 |
| 2009/0186596 A1* | 7/2009 | Kaltsukis | 455/404.2 |
| 2009/0323636 A1* | 12/2009 | Dillon et al. | 370/331 |
| 2010/0041418 A1* | 2/2010 | Edge et al. | 455/456.2 |
| 2010/0284375 A1* | 11/2010 | Ismail | 370/335 |
| 2011/0086609 A1* | 4/2011 | Buehler et al. | 455/404.2 |
| 2011/0319095 A1* | 12/2011 | Burroughs et al. | 455/456.1 |
| 2012/0172065 A1* | 7/2012 | Gosselin et al. | 455/458 |
| 2012/0178411 A1* | 7/2012 | Li et al. | 455/404.2 |
| 2012/0286997 A1* | 11/2012 | Lin et al. | 342/451 |
| 2012/0309341 A1* | 12/2012 | Ward | 455/404.2 |
| 2013/0084835 A1* | 4/2013 | Scherzer et al. | 455/414.1 |
| 2013/0086615 A1* | 4/2013 | Williams et al. | 725/62 |
| 2013/0090107 A1* | 4/2013 | Han | 455/418 |
| 2013/0162471 A1* | 6/2013 | Suzuki et al. | 342/357.43 |
| 2013/0170402 A1* | 7/2013 | Manyakin et al. | 370/259 |
| 2013/0337767 A1* | 12/2013 | Siomina et al. | 455/404.2 |

* cited by examiner

USING MOBILE MESSAGING SERVICE MESSAGE(S) AS BEARER FOR LOCATION RELATED COMMUNICATIONS DURING VOICE CALL

BACKGROUND

In recent years, mobile communication services have expanded and increased in popularity around the world. Many advanced networks offer various wireless mobile communication service for voice calls, mobile messaging services (e.g. text and/or multimedia) and data communications. The data services, for example, enable surfing the world wide web via a browser on a mobile station. Further, more and more applications on a mobile station require information identifying location of the mobile station.

There are several existing technologies used for determining a mobile station's position or location. One existing technology employs a Global Positioning System (GPS) installed in a mobile station for determining its location. Another existing technology relies on a backend positioning server on a network to determine location of a mobile station and provides location related information. For example, WiFi and cellular base station based (e.g., cellular identification based) positioning technologies rely on such a backend positioning server to determine location of a mobile station. Both WiFi and cellular base station based technologies are network based positioning techniques since location of a mobile station is determined and provided by a network element (e.g., a positioning server on a network). On the other hand, a mobile station equipped with a standalone GPS does not require the backend positioning server on the network to determine its location. Further, in many mobile applications, these existing technologies can be used in a hybrid fashion to determine location of a mobile station in the fastest and cheapest way (e.g., any one of WiFi based, cellular base station based, or GPS based technology, or any combination thereof). For example, a weather forecast mobile application may only desire a coarse location (e.g., zip code, or city level), making the cellular base station based technology the best fit because it is fastest. A people-tracking application may require a hybrid approach for providing its location based service; for example, when indoors, the WiFi based technology can be used for determining a precise location of the mobile station; and when outdoors, the GPS based approach can be used for determining its location.

As more and more mobile applications rely on acquiring information about location of a mobile station via a hybrid of network based positioning (e.g., using a backend positioning server) and device based positioning (e.g., using a standalone GPS) technologies, there is a growing need for obtaining location information of a mobile station for use by a mobile application while a voice call is in progress on the mobile station. However, some mobile communication or traffic networks, such as certain Third Generation (3G) and earlier Code Division Multiple Access (CDMA) type networks, do not support simultaneous voice and data communications to and from the same mobile station. In such a CDMA type network, if a mobile station is not equipped with GPS or is unable to use its installed GPS, obtaining location information for a mobile application running on the mobile station from a backend positioning server on the network, while a user of the mobile station is on a voice call, is not permitted because both voice and data communications with the mobile station cannot be simultaneously supported, except under certain circumstances, for example, E911 service.

For mobile stations without GPS capability, location based services can be provided by using two types of existing technologies: control plane based technologies and user plane based technologies. The control plane based technologies often refer to technologies that use control channels or air links to the mobile communication network for obtaining location information of a mobile station from a positioning server on a network. On the other hand, the user plane based technologies refer to technologies that use traffic channels or air links to the mobile communication network for obtaining location information of a mobile station from a positioning server on a network That is, in the control plane based technologies the mobile station uses the control channels (or dedicated control channels) of the mobile communication network for signaling to initiate a request for location information of the mobile station and receive the determined location information of the mobile station from the positioning server on the network. In the user plane based technologies, however, the mobile station uses traffic channels (including IP transport bearer) for signaling to initiate a request for location information of the mobile station and receive the determined location information of the mobile station from the positioning server on the network. Thus, in the user plane based technologies, the request and the determined location information are treated as user traffic data.

For example, in a CDMA type network, E911 service uses one of the control plane based technologies to determine location of a mobile station when a user of the mobile station dials 911 for an emergency call. That is, while the user is on the emergency call on a voice channel, a dedicated control channel is used to determine the location of the mobile station. However, control plane based technologies have limitations because they use the circuit switched network and the use of control channels becomes too expensive from a carrier's point of view as a growing number of mobile applications providing location based services use the control channels, which are limited system resources. User plane based technologies provide cheaper alternatives, but not without disadvantages. That is, user plane based technologies require use of Internet Protocol (IP) as a transport bearer and often require simultaneous support of voice and data communications during an active voice call on a mobile station. As a result, in a CDMA type network in which simultaneous voice and data communications cannot be supported by design, existing user plane based technologies (e.g., technologies using the IP as the transport bearer) for location based services cannot be effectively used to obtain location information of a mobile station from a positioning server on the CDMA type network while a user of the mobile station is on an active voice call through the CDMA type network.

Hence, there is still a need for an improved or simplified technique for obtaining information identifying location of a mobile station from a positioning server on a network, while a user of the mobile station is on a voice call through a CDMA type network that does not support simultaneous voice and data communications with the mobile station.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

Figure 1:
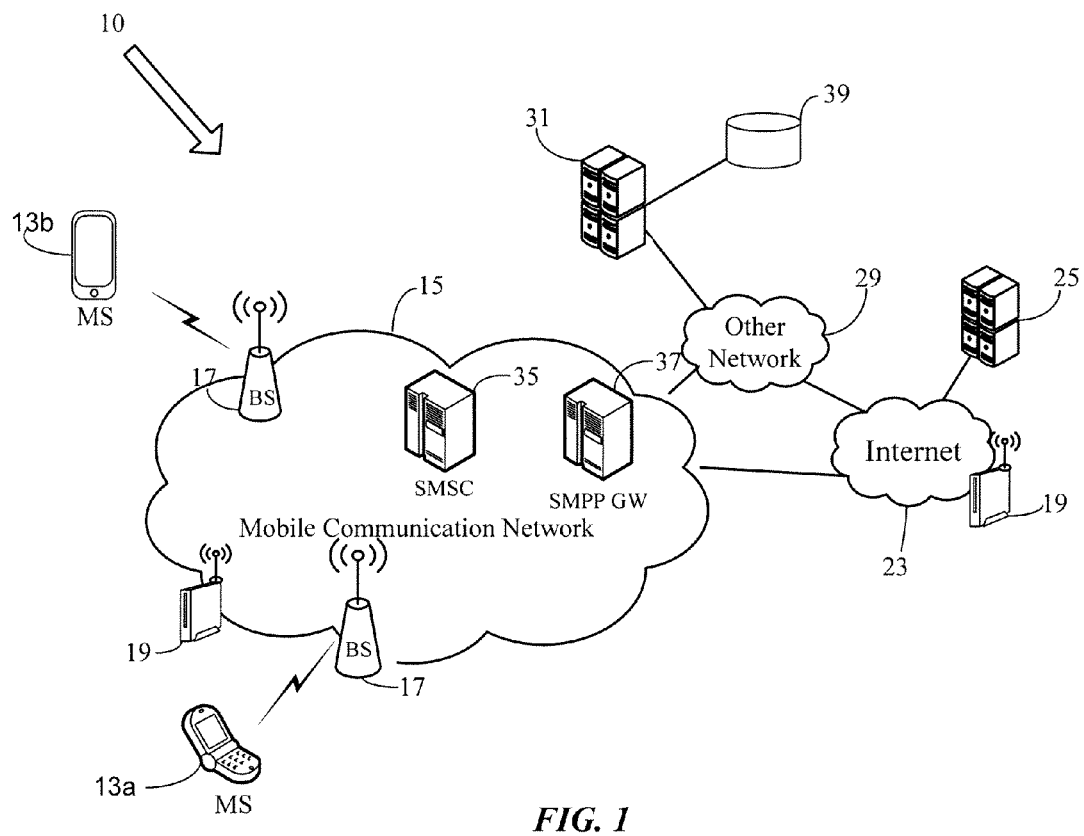
FIG. 1 is a high-level functional block diagram of an exemplary system of networks/devices that provide various communications for mobile stations and support an exemplary techniques for obtaining location information from a network for a mobile station during a voice call.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The examples discussed herein provides location information for a mobile station during an active voice call through a CDMA type network or the like that does not support simultaneous voice and data communications with the mobile station. In such a network, mobile messaging service type messages are used, as the transport bearer between the mobile station and the network, to obtain the location information for the mobile station from a positioning server on the network, while a user of the mobile station is on a voice call.

When the user of the mobile station is on a voice call, in response to a query for location of the mobile station by an application program running on the mobile station, the mobile station generates a mobile messaging service type message containing a request for location information for the mobile station from a positioning server on a network. The request includes at least some information obtained from the air by wireless reception of radio frequency signals by the mobile station. The mobile messaging service type message is sent to the mobile communication network (and to the positioning server) during the voice call through the mobile communication network. The positioning server determines the location of the mobile station based on the received information contained in the mobile messaging service type message. The determined location information is sent to the mobile station using a responsive mobile messaging service type message through the mobile communication network. The responsive mobile messaging service type message contains the requested location information for the determined mobile station and/or error radius information. While the user of the mobile station is on the voice call, the received location information of the mobile station is provided to the requesting application program running on the mobile station for further processing.

Also, an exemplary method is provided for receiving a request for location information of a mobile station through a mobile communication network and providing to the mobile station the requested location information that is determined by a positioning server on a network, using mobile messaging service type messages through the mobile communication network.

In the exemplary method, a messaging service server receives from the mobile station, through the mobile communication network that does not support simultaneous voice and data communications with the mobile station, a mobile messaging service type message during a voice call of the mobile station through the mobile communication network. The mobile messaging service type message includes a request for location of the mobile station for use by an application program running on the mobile station and at least some information obtained from the air by wireless reception of radio frequency signals by the mobile station. The messaging service server sends the information contained in the received mobile messaging service type message to the positioning server. The positioning server then determines the location of the mobile station, based on in part the at least some information, and sends to the messaging service server identification of the determined location of the mobile station, for transmission of a responsive mobile messaging service type message over the mobile communication network to the mobile station. The messaging service server sends to the mobile station the responsive mobile messaging service type message through the mobile communication network, during the voice call. The responsive mobile messaging service type message includes the identification of the determined location of the mobile station as the requested location information of the mobile station and/or error radius information, for the use and processing by the application program running on the mobile station.

Further, an exemplary system is provided for using mobile messaging service type messages as a transport bearer for location related communications during a voice call of a mobile station. The exemplary system includes a mobile communication network in which simultaneous voice and data communications with the mobile station are not supported, a messaging service server for receiving and sending mobile messaging service type messages to and from the mobile station through the mobile communication network, and a positioning server for determining location of the mobile station based on information received from the mobile station.

In the exemplary system, in response to a query for location of the mobile station by an application program running on the mobile station, during a voice call of the mobile station through the mobile communication network, the mobile station sends a request for location information of the mobile station using a mobile messaging service type message. The request includes at least some information obtained from the air by wireless reception of radio frequency signals by the mobile station. The mobile messaging service type message is used as a transport bearer between the mobile station and the mobile communication network for determining the location of the mobile station by the positioning server during the voice call of the mobile station through the mobile communication network. After the positioning server determines the location of the mobile station, a responsive mobile messaging service type message is sent to the mobile station, providing information identifying the determined location of the mobile station and/or error radius information for use by the application program during the voice call.

As a result, using the disclosed exemplary techniques herein, in a mobile communication network in which simultaneous voice and data communications are not supported, location information for a mobile station is obtained from a positioning server on a network by using mobile messaging service type messages as a transport bearer during the voice call of the mobile station over the mobile communication network, thereby providing an alternative to the existing technologies.

Reference now is made in detail to the examples illustrated in the accompanying drawings and discussed below. FIG. 1 illustrates a system 10 offering a variety of mobile communication services, including wireless communications for mobile messaging services, such as Short Messaging Service (SMS), and Enhanced Messaging Service (EMS) for mobile station users. For the purposes of simplicity, the example illustrates only two mobile stations (MSs) 13a and 13b and a mobile communication network 15. The mobile stations 13a and 13b are examples of mobile devices that may be used for various voice communications, data communications, and mobile messaging services. The mobile communication network 15 provides mobile wireless communications services to those mobile stations as well as to other mobile stations (not shown), for example, via a number of base stations (BSs) 17 and wireless access points 19 (e.g., WiFi access points). The present techniques may be implemented in any of a variety of available mobile communication networks 15 and/or on any type of mobile station compatible with such a mobile communication network 15. For the purposes of discussion herein, however, only a few relevant elements of the mobile communication network 15 are illustrated.

In the example, the mobile communication network 15 might be implemented as a network conforming to the code division multiple access (CDMA) type standard, the 3rd Generation Partnership Project 2 (3GPP2) standard, the Evolution Data Optimized (EVDO) standard, or other telecommunications standards used for public mobile wireless communications. The mobile stations 13a and 13b are capable of conventional voice telephone and data communications, although the network does not support simultaneous voice and data communications with the same mobile station 13a or 13b.

By design, the CDMA standard does not support simultaneous voice and data communications or services. As a result, a CDMA type network uses different channels for the two services: one channel for voice only and a different channel for data only. For example, when a user of a CDMA mobile station gets a voice call while using data services (e.g., surfing the Internet) on the CDMA mobile station, the voice call interrupts the data connection to the mobile communication network 15. Similarly, when the user wants to access a website on the Internet 23, the user needs to disconnect the voice call before trying to establish a data or Internet Protocol (IP) connection to a server hosting the website over the Internet 23.

The mobile stations 13a and 13b can take the form of portable handsets, smart-phones or personal digital assistants, tablet devices or the like, although they may be implemented in other form factors. The mobile stations 13a and 13b execute various stored mobile applications on the devices. An application running on a mobile station 13a or 13b may be configured to execute on many different types of the mobile stations. For example, a mobile application can be written to execute in an iOS or Android operating system, or on a binary runtime environment for a BREW-based mobile station, a Windows Mobile based mobile station, Java Mobile, or RIM based mobile station (e.g., Blackberry), or the like. Some of these types of mobile stations can employ a multi-tasking operating system as well.

The mobile communication network 15 can be implemented by a number of interconnected networks. Hence, the mobile communication network 15 may include a number of radio access networks (RANs), as well as regional ground networks interconnecting a number of RANs and a wide area network (WAN) interconnecting the regional ground networks to core network elements. A regional portion of the network 15, such as that serving mobile stations 13a and 13b, can include one or more RANs and a regional circuit and/or packet switched network and associated signaling network facilities.

Physical elements of a RAN operated by a mobile service provider, or carrier, include a number of base stations represented in the example by the base stations (BSs) 17. Although not separately shown, such a base station 17 can include a base transceiver system (BTS), which can communicate via an antennae system at the site of the base station 17 and over the air with one or more of the mobile stations, when the mobile stations are within a range. Further, each base station 17 includes a BTS coupled to several antennae mounted on a radio tower within a coverage area often referred to as a "cell." The BTS is the part of the radio network that sends and receives radio frequency (RF) signals to/from the mobile stations 13a and 13b that are served by the base station 17.

WiFi Access points 19 are WiFi based equipment or devices that allow the mobile stations 13a and 13b to connect to various networks 15, 29, and 23. Typically, a WiFi access point 19 provides the mobile stations 13a and 13b, which are within a short distance (e.g., about 100 meters) from the WiFi access point 19, with connectivity to the networks.

The radio access networks can also include a traffic or mobile communication network represented generally by the cloud at 15, which carries the user communications and data for the mobile stations 13a and 13b between the base stations 17 and other elements with or through which the mobile stations 13a and 13b communicate. In some examples, the mobile communication network 15 includes various network elements that support voice communications and other functionalities, including mobile messaging service type messages, such as SMS and EMS messages. Examples of other network elements that may be used in support of messaging service communications include, but are not limited to, messaging centers or mobile messaging servers 35 for managing mobile messaging service type messages to and from the mobile stations 13a and 13b, and short messaging point-to-point gateways 37. Other individual elements, such as switches and/or routers forming the traffic network are omitted here for simplicity. It will be understood that the various network elements can communicate with each other and other aspects of the mobile communications network 15 and other networks, e.g., the public switched telephone network (PSTN) and the Internet 23, either directly or indirectly.

The carrier also operates a number of systems that provide ancillary functions in support of the mobile communications services and/or application services provided through the system 10, and those elements communicate with other nodes or elements of the system 10 via one or more private Internet Protocol (IP) type packet data networks 29 (sometimes referred to as an Intranet), i.e., a private network. Generally, such ancillary systems are part of or connected for communication via the private network 29. It is well known, however, that systems outside of the private network could serve the same functions as well. Examples of such systems, in this case operated by the carrier or network service provider as part of the overall network 10, which communicate through the intranet type network 29, include one or more application servers, such as a positioning server 31 for determining and providing location information of mobile stations 13a and 13b.

The system 10 also includes a messaging service server 35. The messaging service server 35 is one or more servers that are equipped with messaging service capability. In the example, the messaging service server 35 is a Short Messaging Service Center (SMSC) for SMS messages. Wireless carriers developed the SMS to transmit text messages for display on the mobile stations 13a and 13b. In many existing network architectures, the SMS traffic uses the signaling portion of the network to carry message traffic between the SMSC 35 and the mobile stations 13a and 13b. Generally, the SMSC 35 supports mobile station to mobile station delivery of text messages. However, in the exemplary implementation herein, the SMSC 35 also supports communication of messages between the mobile stations 13a and 13b and network elements or devices coupled to other networks. For example, the SMSC 35 receives from the mobile station 13a or 13b an incoming message in the form of a SMS message requesting location of the mobile station 13a or 13b via the network 15, and sends the information contained in the SMS message to a destination network element, e.g., a positioning server 31. For this type of SMS related communications, the network 15 also includes one or more Short Message Peer-to-Peer Gateways (SMPP GW) 37. The SMSC 35 receives from the positioning server 31 a response with the requested location through the SMPP GW 37 and sends the location information via an SMS message through the network 15 and over the air to the requesting mobile station 13a or 13b. Hence, SMS messages are used to provide the transport bearer for requesting and receiving location related information.

In another implementation, instead of the SMS messages, Enhanced Messaging Service (EMS) messages can be used as a transport bearer for obtaining the location information for the mobile station from the network 15. The EMS messages are enhanced versions of SMS messages and thus can have special text formatting (e.g., such as bold or italic), animations, pictures, icons, sound effects, and special ring tones.

In the example, the SMPP GW 37 provides functionality to send messaging service type messages to other mobile communication networks and elements, e.g., a positioning server 31, and also receives responsive messages from other networks via communications using the other protocols. The SMPP GW 37 is used to connect the wireless communication network (such as an Internet Protocol (IP) network) to another network, serving as an entity within the network 15 that acts as an intermediary between the wireless service provider's network and other networks. As a result, the SMPP GW 37 converts messages in protocol(s) used by other applications and devices, e.g., Extensible Markup Language (XML), Hypertext Transfer Protocol (HTTP), etc., to and from the SMPP protocol.

Mobile stations 13a and 13b communicate over the air with a base station 17 and through the mobile communication network 15 for various voice and data communications, e.g., through the Internet 23 with a server 25 and/or with application servers 31. If the carrier offers a location service, the location service may be hosted on a carrier operated application server (e.g., a backend positioning server 31), for communication via the networks 15 and 29. Although many mobile stations include global positioning systems (GPS) as part of hardware components, some mobile stations do not include GPS. If a mobile station 13a or 13b is not equipped with a GPS and an application on the mobile station 13a or 13b desires to use location of the mobile station 13a or 13b, the mobile station 13a or 13b connects to the mobile communication network 15 to obtain its location from the positioning server 31 or the like. Further, even though a mobile station 13a or 13b has an installed GPS, the mobile station 13a or 13b may not be able to determine its location because of weak or blocked signals (e.g., indoors or GPS signals not obtained). In such a situation, the mobile station 13a or 13b can receive the location services from the mobile communication network 15 (e.g., obtain its location from the positioning server 31 or the like).

In the example, as shown in FIG. 1, the positioning server 31 is connected to a location database 39, which includes location information of cellular base stations 17 within the mobile communication network 15 and/or WiFi access points 19 operated by or known to the carrier. Alternatively, the location service may be provided by a separate, third party entity (alone or through agreements with the carrier), in which case the service may be hosted on an application server, such as a server 25. Servers such as 25 and 31 may provide any of a variety of common application or service functions in support of or in addition to an application program running on the mobile station 13a or 13b. However, for the purposes of discussion herein, we will focus on functions thereof in support of a mobile location service. For a given service, including the mobile location service, an application program within the mobile station may be considered as a 'client' and the programming at 25 or 31 may be considered as the 'server' application for the mobile location service.

The mobile station's location information under consideration herein may be delivered to touch screen type mobile stations as well as to non-touch type mobile stations. Hence, our simple example shows the mobile station (MS) 13a as a non-touch type mobile station and shows the mobile station (MS) 13b as a touch screen type mobile station. Implementation of the disclosed techniques herein will involve at least some execution of programming in the mobile stations.

Figure 2A:
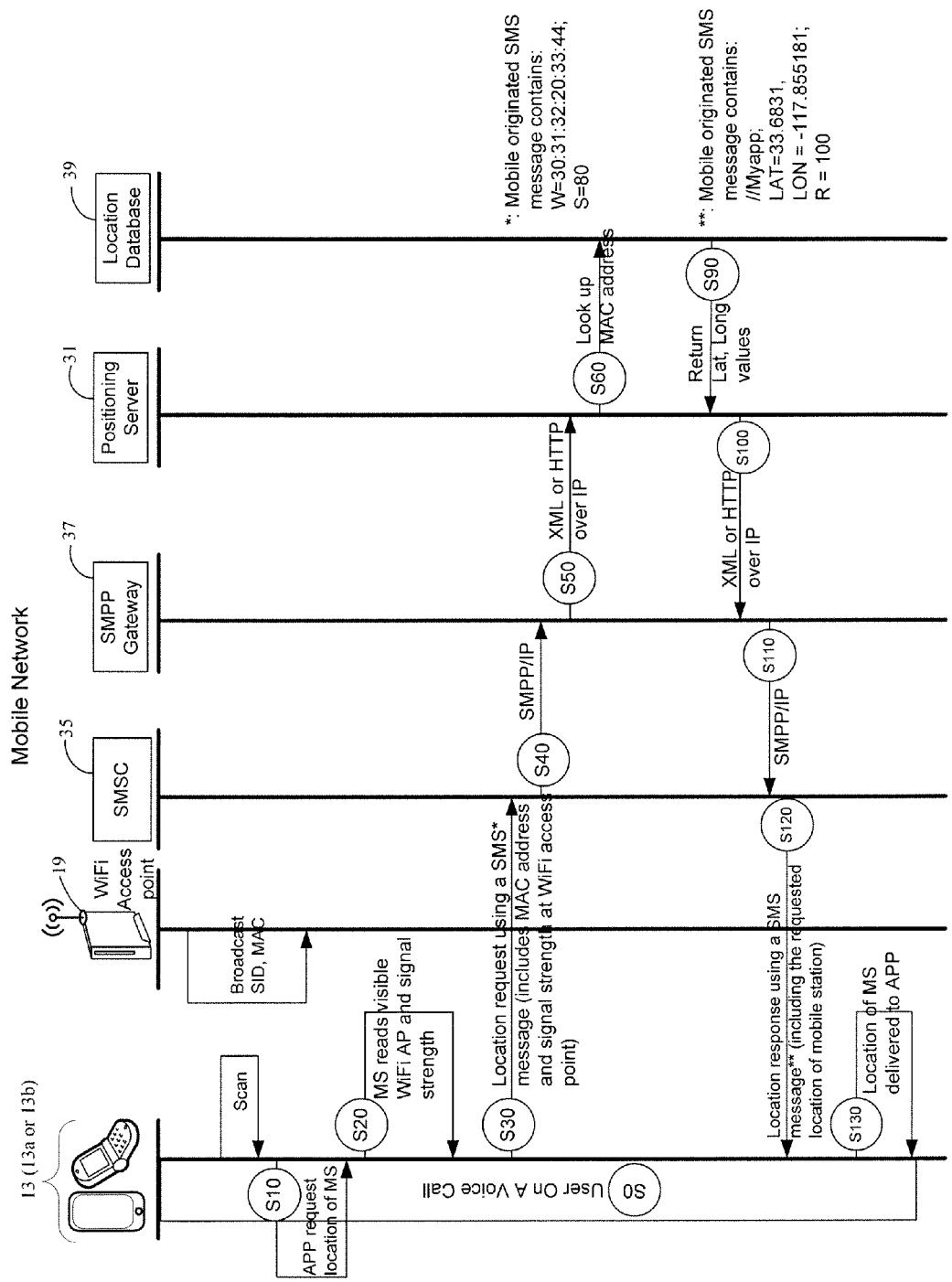
FIGS. 2A and 2B are high-level sequence diagrams for exemplary implementations of techniques for obtaining location information for a mobile station while on a voice call through a mobile communication network.
Figure 2B:
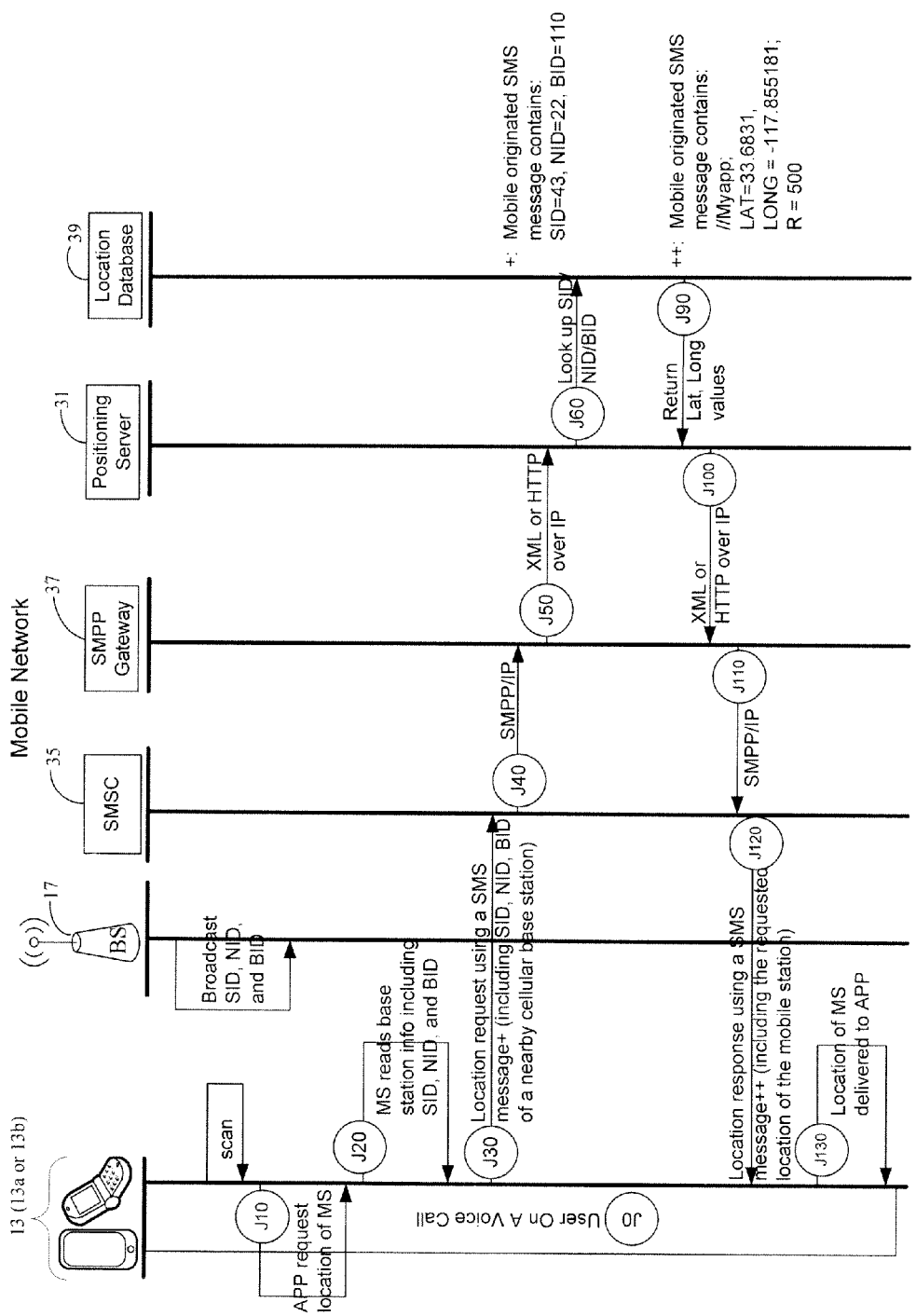

FIGS. 2A and 2B illustrate exemplary techniques for using mobile messaging service type messages as a transport bearer between a mobile station and a network for requesting and receiving location information for the mobile station from the network, for use by a mobile application running on the mobile station, while the mobile station is engaged in a voice call and using data (e.g., IP) bearer transport through the network is not possible to obtain the location information from the network.

More specifically, FIGS. 2A and 2B illustrate using SMS messages as a transport bearer for obtaining location of a mobile station 13a or 13b from a network while a user of the mobile station 13a or 13b is on a voice call. FIG. 2A illustrates a simplified signal flow between various network elements for obtaining the location of the mobile station 13a or 13b based in part on detection and identification of a nearby WiFi access point 19 during a voice call. FIG. 2B illustrates a simplified signal flow between various network elements for obtaining the location of the mobile station 13a or 13b based in part on detection and identification of a nearby cellular base station 17 during a voice call. For the discussion purposes herein, it is presumed that the mobile station 13a or 13b cannot use GPS for obtaining its location (e.g., no installed GPS or poor GPS signals). For example, the mobile station 13a or 13b with GPS capability is unable to use its GPS, e.g., because the mobile station 13a or 13b is indoors or otherwise prevented from receiving GPS satellite signals. It is also presumed that there is no IP transport bearer (e.g., no IP data connection) for use during the voice call connection through the mobile communication network 15.

Mobile applications running on a mobile station 13a or 13b may provide different levels of location-based services to a user of the mobile station 13a or 13b. Depending on the levels of location-based services provided by the mobile applications, location of the mobile station 13a or 13b can be determined by a positioning server 31 on a network based on certain information received from the mobile station 13a or 13*b* (e.g., information regarding nearby WiFi access point(s) and/or cellular base station(s) detected by the mobile station 13*a* or 13*b*). For example, if the mobile application desires to obtain more precise or fine estimation of location of the mobile station 13*a* or 13*b*, the mobile station 13*a* or 13*b* sends the information regarding nearby WiFi access point(s) detected by the mobiles station 13*a* or 13*b* to the network for use by the positioning server 31, as illustrated in FIG. 2A; and if the mobile station 13*a* or 13*b* does not need to have precise location of the mobile station 13*a* or 13*b*, the mobile station 13*a* or 13*b* sends the information regarding nearby cellular base station 17 detected by the mobile station 13*a* or 13*b* to the network for use by the positioning server 31, as illustrated in FIG. 2B.

In FIG. 2A, at S0, it is presumed that a user of a mobile station 13 (13*b* or 13*a*) is on a voice call with another person. At S10, during the voice call, a mobile application (e.g., myapp) running on the mobile station 13 requests precise location information of the mobile station 13 for further use and processing (but cannot obtain its location information from the mobile station 13, e.g., no installed GPS, no or poor GPS signals, etc.). In the example, the mobile application (e.g., myapp) requests the location information of the mobile station 13 (e.g., latitude and longitudinal coordinate values) from a network. Some mobile applications may desire error radius information in addition to the location information, for example, to provide location based services with more precision. Here, "error radius" is used to mean a radius of a circle (e.g., a radius of positioning errors) within which the mobile station 13 is likely to be found from determined location of the mobile station 13 by the positioning server 31.

At S20, based on received radio frequency (RF) signals, the mobile station 13 obtains information identifying a nearby WiFi access point detected by the mobile station 13 during its scanning operations, such as WiFi network identifier (ESSID), radio frequency (RF) signal strength, and media access control (MAC) address of the nearby WiFi access point. At S30, the mobile station 13 generates a mobile messaging service type message, for example, a SMS message, containing a request for information regarding the location of the mobile station 13. The request includes the information obtained by wireless reception of radio frequency signals from the nearby WiFi access point 19, such as ESSID, RF signal strength, and its MAC address. The mobile station 13 sends the SMS message to a base station 17 of the mobile communication network 15 for delivery to a messaging service server 35 (e.g., a SMSC) for the SMS message, while the voice call is in progress. The received SMS message is delivered from the base station 17, via a signaling (e.g., SS7 signaling) channel in the network 15, to the SMSC 35.

At S40, the SMSC 35 sends the message as a Short Message Peer-to-Peer (SMPP) message over IP transport to a SMPP GW 37 for delivery to a positioning server 31 for determining the location of the mobile station 13. Because of the protocols (e.g., SMPP/IP) used between the SMSC 35 and the SMPP GW 37, the SMSC 35 formulates data contained in the SMS message into a SMPP message and routes it to the SMPP GW 37 over the private IP interconnection. The SMPP message includes, among other information, an identification (ID) of the mobile station 13 (e.g., the mobile directory number (MDN) of the mobile station) as an origination address, and a code for the positioning server 31 as a destination address. That is, the SMPP message is addressed to the positioning server 31, for example, by a unique code assigned to the positioning server 31. Upon receiving the SMPP message, at S50, the SMPP GW 37 processes the message, performs any necessary protocol conversion (e.g., extensible markup language (XML) or hypertext transfer protocol (HTTP) over IP), and delivers the data or information to the positioning sever 31 over a private network 29 or the Internet 23 for determining the location of the mobile station 13 based on the received data. Alternately, the SMPP GW 37 may pass through the message in SMPP protocol, without any protocol conversion, to the positioning server 31 or a remote server where necessary protocol conversion is performed. In the example, the SMS message includes information regarding the nearby detected WiFi access point 19, such as its MAC address (e.g., W=30:31:32:20:33:44), and radio frequency signal strength (e.g., S=80).

At S60, based on the received data in the SMS message (e.g., the radio frequency signal strength and MAC address of the nearby WiFi access point 19 detected by the mobile station 13), the positioning server 31 determines the location of the mobile station 13 by querying a location database 39. The location database 39 contains, among other information, tables of locations of WiFi access points known to the carrier and their latitude and longitudinal coordinates values. The location database 39 containing the locations of WiFi access points can be built by the carrier or can be supplied by third party in agreement with the carrier. Also, the locations of WiFi access points can be entered into the location database 39 manually or by an automated process via a script. Alternately, WiFi access points equipped with GPS capability can automatically register their locations with the carrier for the purpose of building the location database 39. In the example, to determine the location of the mobile station 13, the positioning server 31 looks up (at S60) the MAC address of the nearby WiFi access point 19 and retrieves (at S90) its corresponding location information including its latitude and longitudinal coordinate values and computes error radius for the location of the mobile station 13.

At S100, the positioning server 31 prepares and returns a responsive message in accordance with appropriate protocols and sends the responsive message over IP transport to the SMPP GW 37. The responsive message contains information identifying the location of the mobile station 13 (e.g., latitude and longitudinal coordinate values) and may contain additional error radius information. At S110, in accordance with the SMPP over IP transport, the responsive message is transmitted from the SMPP GW 37 to the SMSC 35 for wireless transmission of the requested location information via a responsive SMS message to the mobile station 13 over the mobile communication network 15. At S120, the SMSC 35 sends to the mobile station 13, via a base station 17, the responsive SMS message containing the requested location information of the mobile station 13, while the mobile station is still on the voice call. In our example, the responsive SMS message contains the requested location information in the following format: //myapp: Lat (latitude)=33.6831°, Lon (longitudinal)=−117.855181°, R (error radius)=100 meters). In the responsive SMS message, "myapp" is the application program that requested location information during the active voice call of the mobile station 13, "Lat" and "Lon" are latitude and longitudinal coordinate values of the determined location of the mobile station 13, and "R" is a radial distance ("error radius") indicating that the mobile station 13 can be found within the radial distance of the determined location. For example, R=100 meters (e.g., error radius is 100 meters) means that the mobile station 13 is likely to be found within a 100 meter radial distance from the determined location by the positioning server 31. At S130, the received location information of the mobile station 13 (e.g., content of the received responsive SMS message) is delivered to the application program (e.g., myapp) that requested the location information of the mobile station 13. Here, the received location information via the SMS message can be appropriately formatted before being delivered to the application program for use. Alternately, the application program may appropriately format or translate the received location information via the SMS message for its use and processing.

It is noted that in the example, although SMS messages are used as a transport bearer between the mobile station 13 and the SMSC 35 in the network 15 for requesting and receiving the location information of the mobile station 13 during the active voice call, other mobile messaging service messages, such as EMS messages can be used as the bearer transport.

Similarly, FIG. 2B shows an illustrative signal flow for determining location of the mobile station, based on in part information of a nearby cellular base station detected by the mobile station. Referring to FIG. 2B, at J0, a user of the mobile station 13 (13*a* or 13*b*) is on a voice call with another party. At J10, during the voice call, a mobile application program (e.g., myapp) running on the mobile station 13 requests location information of the mobile station 13 for use. At J20, the mobile station 13 obtains information regarding a nearby cellular base station, such as system identification (SID), network identification (NID), base station identification (BID), and RF signal strength of the nearby cellular base station detected by the mobile station 13. At J30, the mobile station generates a mobile messaging service type message, for example, a SMS message, containing a request for location information of the mobile station 13 and certain information obtained from the air by wireless reception by the mobile station 13 (e.g., SID, NID, and BID). The mobile station 13 prepares and sends the SMS message to a base station 17 of the mobile communication network 15 for delivery to the SMSC 35, while the voice call is still in progress. In the example, the exemplary SMS message includes the certain information regarding the nearby cellular base station 17 detected by the mobile station 13, e.g., SID=43, NID=22, and BID=110.

The received SMS message is delivered from the base station 17, via signaling (e.g., SS7 signaling) of the mobile communication network 15 to the SMSC 35. At J40, the SMSC 35 sends the received message as a SMPP message over IP transport to the SMPP GW 37 for delivery to the positioning server 31 in order to determine the location of the mobile station 13. In accord with the protocols used between the SMSC 35 and the SMPP GW 37, the SMSC 35 formulates data or information received via the SMS message into a SMPP message and routes it to the SMPP GW 37 over the private IP interconnection. As noted earlier, the message includes, among other information, an ID of the mobile station 13 (e.g., the MDN of the mobiles station) as an origination address and a code for the positioning server 31 as a destination address. That is, the message is address to the positioning server 31, for example, by a unique code assigned to the positioning server 31. Upon receiving the SMPP message, at J50, the SMPP GW 37 processes the message, performs any necessary protocol conversion (e.g., protocol conversion into XML or HTTP over IP), and delivers the data to the positioning server 31 over the private network 29 or the Internet 23 for determining location of the mobile station. Alternately, the SMPP GW 37 may pass through the message in SMPP protocol, without any protocol conversion, to the positioning server 31 or a remote server where necessary protocol conversion is performed.

At J60, based on in part the received data or information via the SMS message (e.g., information relating to the nearby cellular base station 17 detected by the mobile station 13, such as SID=43, NID=22, and BID=110), the positioning server 31 determines location of the mobile station 13. That is, in the example, the positioning server 31 looks up (at J60) the location information of the mobile station 13 based on the received SID, NID, and BID information of the nearby cellular base station 17 and determines (at J90) its corresponding latitude and longitudinal coordinate values, as the determined location information of the mobile station 13, and computes error radius.

At J100, the positioning server 31 prepares and returns a responsive message in accordance with appropriate protocols and sends the responsive message over IP transport to the SMPP GW 37. The responsive message contains information identifying the location of the mobile station 13 and may contain error radius information. At J110, in accordance with the SMPP over IP transport protocol, the SMPP GW 37 sends the responsive message to the SMSC 35 for wireless transmission of the requested location information via a responsive SMS message to the mobile station 13. At J120, the SMSC 35 sends to the mobile station 13 via the base station 17 the responsive SMS message containing the requested location information of the mobile station 13, while the mobile station 13 is still on the voice call (e.g., the responsive SMS message contains: //myapp: Lat (latitude)=30.6831°, Lon (longitudinal)=−117.855100°, R (error radius)=500 meters). The requested location information in the responsive SMS message informs the mobile station 13 that its latitude and longitudinal coordinate values are 30.6831° and −117.855100° respectively, and error radius is 500 meters. The error radius of 500 meters (e.g., R (error radius)=500 meters) means that the mobile station 13 is likely to be found within a 500 meter radial distance from the determined location by the positioning server 31. At J130, the received location information of the mobile station 13 (e.g., content of the received responsive SMS message) is delivered to the application program (e.g., myapp) that requested the location information of the mobile station 13. Here, the received location information via the SMS message can be appropriately formatted before it is delivered to the application program for use. Alternately, the application program may appropriately format or translate the received location information via the SMS message for its use and processing.

Again, it should be apparent that in the example, although SMS messages are used as a transport bearer between the mobile station 13 and the network 15 for location related communications during the voice call, other mobile messaging service messages, such as EMS messages can be used as the transport bearer.

In the examples above, SMPP protocols can be replaced by other common protocols used over the Internet, such as XML over HTTP or the like. Although the location information of the mobile station 13 is determined based on in part either information regarding a nearby WiFi access point 19 or information regarding a nearby cellular base station 17 detected by the mobile station 13, both information can be used together to determine a more granular location of the mobile station 13 by the positioning server 31. For example, for coarse estimation of the location of the mobile station 13, the information regarding the nearby cellular base station 17 can be used for determining the location information of the mobile station 13, but for a more refined estimation of the location of the mobile station 13, the information regarding the nearby WiFi access point 19 can be used in addition to the information regarding the nearby cellular base station 17 to determine the location of the mobile station 13.

Alternately, the mobile station 13 can send, via a SMS message, information relating to multiple WiFi access points 19 (e.g., more than one nearby WiFi access point 19 detected by wireless reception of radio frequency signals by the mobile station 13) such that the positioning server 31 can use the information regarding multiple WiFi access points 19 in determining the location of the mobile station 13. Alternately, the mobile station 13 can send to the positioning server 31, via a SMS message, information relating to both WiFi access points 19 and cellular base stations 17 detected by wireless reception of radio frequency signals by the mobile station 13 for determining the location of the mobile station 13.

Further, the disclosed techniques can complement or enhance other location based services, e.g., E911 service, by improving its accuracy in determining location of a mobile station 13 when there is no or poor GPS coverage or when a traditional triangulation method cannot be used for determining the location of the mobile station 13. By way of example, since the existing E911 system uses control channels to determine a caller's location, its accuracy in estimating the location of the caller is drastically reduced where there is no or poor GPS coverage (e.g., indoors, urban valleys) or where only a single cell site is available, rendering the triangulation method impossible for determining the location of the caller's mobile station. Thus, the disclosed techniques of using mobile messaging service type messages (e.g., SMS and EMS messages, or the like) as a location information bearer can complement or enhance the existing E911 service's availability. That is, in accordance with the techniques disclosed, the E911 system can use the SMS or EMS messages as the location information bearer and determine the location of the caller based on in part the nearby WiFi and/or cellular base station detected by the caller's mobile station, while the caller is on the emergency call, when there is poor GPS coverage or only a single cell site is available.

The structure, programming and operations of the various types of mobile stations are well known. However, for completeness, it may be useful to consider the functional elements/aspects of two exemplary mobile stations 13*a* and 13*b*, at a high-level.

Figure 3A:
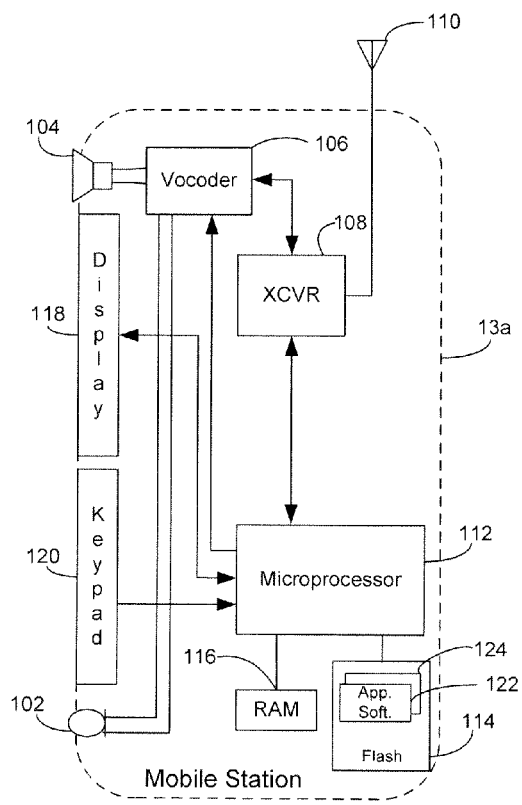
FIGS. 3A and 3B are high-level functional block diagrams of exemplary mobile stations used in a network/system like that shown in FIG. 1.

FIG. 3A provides a block diagram illustration of an exemplary non-touch type mobile station 13*a*. Although the mobile station 13*a* may be a smart-phone or may be incorporated into another device, such as a personal digital assistant (PDA), a personal computer (PC), or the like, for discussion purposes, the illustration shows the mobile station 13*a* is in the form of a handset. The handset embodiment of the mobile station 13*a* functions as a normal digital wireless telephone station. For that function, the mobile station 13*a* includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13*a* also includes at least one digital transceiver (XCVR) 108. Today, the mobile station 13*a* would be configured for digital wireless communications using one or more of the common CDMA network technology types. The mobile station 13*a* may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13*a* and the communication network. Each transceiver 108 connects through RF send and receive amplifiers (not separately shown) to an antenna 110. The transceiver 108 may also support various types of mobile messaging services, such as short message service (SMS) and enhanced messaging service (EMS). The bearer transport resources of the transceiver 108 can support voice communications or can support data communications, but not both at the same time. However, the signaling resources remain available always for a voice call or a data communication. For example, the signaling resources are available to tear down an air link and network connection at the end of a voice call. During a voice call, the available signaling resources of the network and the transceiver can also provide communications of mobile messaging service type messages (e.g., SMS and EMS messages) to and from the mobile station 13*a*.

The mobile station 13*a* includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course, other user interface elements may be used, such as a trackball, as in some types of PDAs or smart phones. In addition to normal telephone and data communication related input/output (including message input and message display functions), the user interface elements also may be used for display of menus and other information to the user and user input of selections.

A microprocessor 112 serves as a programmable controller for the mobile station 13*a*, in that it controls all operations of the mobile station 13*a* in accord with programming that it executes, for all normal operations, and for operations involved in procedures for generating, sending, and receiving mobile messaging type service messages (e.g., SMS or EMS messages) under consideration here. In the example, the mobile station 13*a* includes flash type program memory 114, for storage of various "software" or "firmware" program routines and mobile configuration settings, such as mobile directory number (MDN) and/or mobile identification number (MIN), etc. The mobile station 13*a* may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and application software (or programs) 122, messaging service software 124 or the like.

The application software 122 includes location based application programs requiring location of the mobile station 13*a* for providing its services, for example, "myapp" or a restaurant locator program. By way of example, the restaurant locator program tells a user of a mobile station 13*a* how far the user is away from a restaurant of interest based on location information of the mobile station 13*a*, and thus requires location of the mobile station 13*a* for its processing. It is presumed that the user of the mobile station 13*a* is on a voice call with her friend and wants to find out how far the user is away from a particular restaurant during the voice call. In response to a query for location of the mobile station 13a by the restaurant locator program, the mobile station 13a uses its messaging service software 124 or the like to generate and send to a network, through the transceiver 108, a SMS message containing a request for location of the mobile station 13a. The SMS message includes certain information detected by the mobile station 13a (e.g., information regarding a nearby cellular base station and/or WiFi access point detected by the mobile station 13a). A positioning server on the network receives the request and determines the location of the mobile station 13a based on in part the received information from the mobile station 13a. After the location of the mobile station 13a is determined by the positioning server, the determined location information is sent back to the mobile station 13a via a responsive SMS message. The responsive SMS message is received via the transceiver 108 of the mobile station 13a. The messaging service software 124 or the like processes the received responsive SMS message and extracts the determined location information from the received SMS message. The determined location information is then sent to the restaurant locator program by the messaging service software 124 or the like for further processing and use by the restaurant locator program. Here, the determined location information received via the SMS message can be appropriately formatted or translated for use by the mobile station 13a before it is delivered to the restaurant locator program. Alternately, the restaurant locator program may receive and appropriately format the determined location information for its use and processing.

The memories 114 and 116 also store various data, such as telephone numbers and server addresses, downloaded data, such as multimedia content, and various data input by the user. Programming stored in the flash type program memory 114, sometimes referred to as "firmware," is loaded into and executed by the microprocessor 112.

Figure 3B:
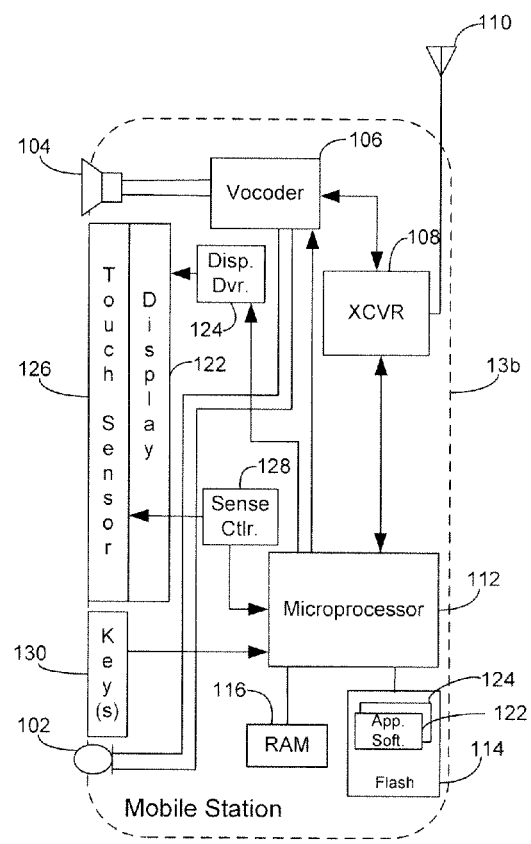

FIG. 3B provides a block diagram illustration of an exemplary touch screen type mobile station 13b. Although possibly configured somewhat differently, at least logically, a number of the elements of the exemplary touch screen type mobile station 13b are similar to the elements of the mobile station 13a, and are identified by like reference numbers in FIG. 3A. For example, the touch screen type mobile station 13b includes a microphone 102, speaker 104 and vocoder 106, for audio input and output functions, much like in the earlier example. The mobile station 13b also includes at least one digital transceiver (XCVR) 108, for digital wireless communications, although the mobile station 13b may include an additional digital or analog transceiver.

As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver 108 may also support various types of mobile messaging services, such as short message service (SMS) and enhanced messaging service (EMS). In addition, as noted earlier, the bearer transport resources of the transceiver 108 can support voice communications or can support data communications, but not both at the same time. However, the signaling resources remain available always for a voice call or a data communication. For example, the signaling resources are available to tear down an air link and network connection at the end of a voice call.

As in the example of station 13a, a microprocessor 112 serves as a programmable controller for the mobile station 13b, in that it controls all operations of the mobile station 13b in accord with programming that it executes, for all normal operations, and for operations involved in the procedure of obtaining location of the mobile stations using mobile messaging service type messages (e.g., SMS or EMS messages or the like) under consideration here. In the example, the mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, outlined above, the mobile station 13b includes a processor, and programming including application software (or programs) 122. The programming stored in the flash memory 114 configures the processor of the mobile station 13b to perform various desired functions, including in this case the functions involved in the technique for requesting and receiving location information of the mobile station 13b via mobile messaging service type messages (e.g., SMS or EMS messages or the like) from a positioning server, while a user of the mobile station 13b is on a voice call, in a CDMA type network that does not support simultaneous voice and data communications.

The application software 122 includes location based application programs requiring location information of the mobile station 13b for providing its services, for example, a restaurant locator program. As discussed above, the restaurant locator program is an application program requiring location of the mobile station 13b for its processing. When a user of the mobile station 13b is on a voice call with her friend, the user wants to find out how far the user is away from a particular restaurant of interest, by executing the restaurant locator program during the voice call. In response to a query for location of the mobile station 13b by the restaurant locator program, the mobile station 13b executes its messaging service software 124 or the like to generate and send to a network, via the transceiver 108, a SMS message containing a request for the location of the mobile station 13b and certain information detected by the mobile station 13b (e.g., information regarding a nearby cellular base station and/or WiFi access point detected by the mobile station 13b). A positioning server on the network receives the request and determines the location of the mobile station based on in part the received information from the mobile station 13b. After the location of the mobile station 13b is determined by the positioning server, the determined location information is sent back to the mobile station 13b using a responsive SMS message. The responsive SMS message is received by the mobile station 13b via the transceiver 108. The messaging service software 124 or the like processes the received responsive SMS message and extracts the determined location information from the received responsive SMS message. The determined location information is then sent to the restaurant locator program by the messaging service software 124 or the like for further processing and use by the restaurant locator program running on the mobile station 13b.

In the example of FIG. 3A, the user interface elements included a display and a keypad. The mobile station 13b may have a limited number of key 130, but the user interface functions of the display and keypad are replaced by a touch-screen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 122, which the microprocessor 112 controls via a display driver 124, to present visible outputs to the device user. The mobile station 13b also includes a touch/position sensor 126. The sensor 126 is relatively transparent, so that the user may view the information presented on the display 122. A sense circuit 128 senses signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13b. The microphone 102 and speaker 104 may be used as additional user interface elements, for audio input and output.

The structure and operation of the mobile stations 13a and 13b, as outlined above, were described to by way of example, only. In addition, although FIGS. 3A and 3B do not illustrate that the mobile station 13a or 13b is equipped with a GPS, the disclosed techniques herein apply to a mobile station equipped with GPS capability but unable to determine its location because of no or poor reception of GPS satellite signals, hardware failure, etc.

As shown by the above discussion, in addition to functions implemented by the mobile station, some functions relating to requesting and/or receiving location of a mobile station may be implemented on computers connected for data communication via the components of a packet data network, operating as separate network or server elements as shown in FIG. 1. Although special purpose devices may be used, such devices also may be implemented using one or more hardware platforms intended to represent a general class of data processing device commonly used to run "server" programming so as to implement for a SMSC, SMPP GW, and/or a positioning server discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for implementing techniques for requesting and receiving location of a mobile station via mobile messaging service type messages. The software code relates to such server or network element functions and is executable by the general-purpose computer. In operation, the code is stored in a non-transitory storage medium within the general-purpose computer platform. At other times, however, the software may be stored at other locations and/or transported for loading into the appropriate general-purpose computer system. Software code for applications or other programming for the mobile stations also may be stored in a server and transmitted through the network for storage in memories of the mobile stations.

Figure 4:
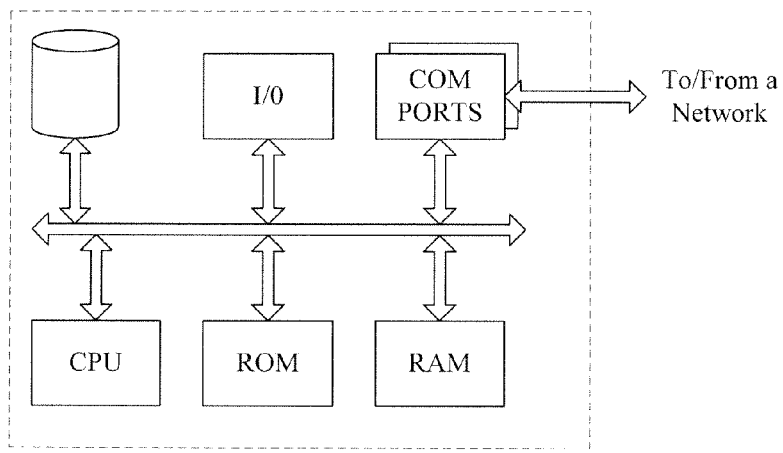
FIG. 4 is a simplified functional block diagram of a computer that may be configured as a host or server, as shown in the system of FIG. 1.
Figure 5:
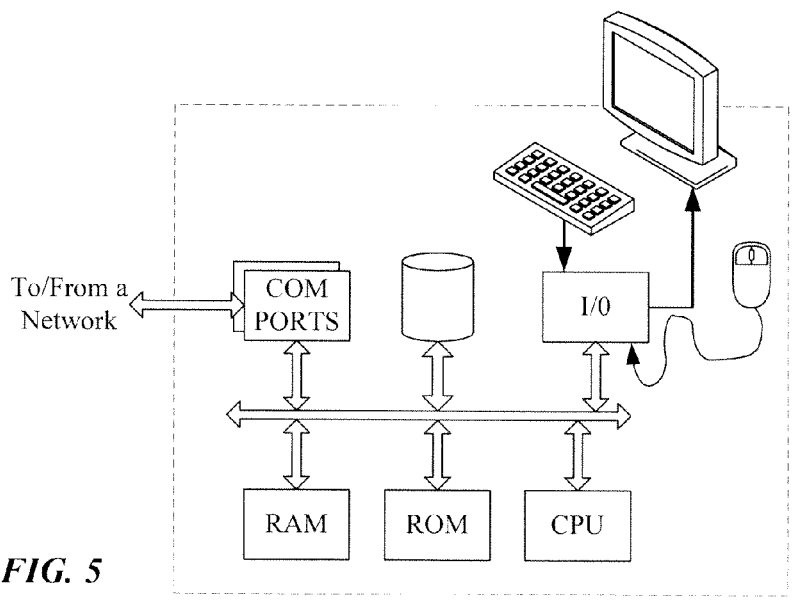
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server.

A server, for example, a messaging service server 35 or positioning server 31, includes a data communication interface for packet data communications. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications.

In the example, a processor of the messaging service server 35 (e.g., SMSC) configures the messaging service server 35 to perform various functions, including functions to: receive from a mobile station (13a or 13b), through a mobile communication network 15 in which simultaneous voice and data communications with the mobile station are not supported, a mobile messaging service type message (e.g., a SMS or EMS message) during a voice call; send information contained in the mobile messaging service type message to a positioning server 31 for determining location of the mobile station; and send to the mobile station a responsive mobile messaging service type message (e.g., a SMS or EMS message) through the mobile communication network 15 for the use by an application program running on the mobile station. The mobile messaging service type message includes a request for the location of the mobile station for use by the application program running on the mobile station and at least some information obtained from the air by wireless reception of radio frequency signals by the mobile station, during the voice call of the mobile station through the mobile communication network 15. The responsive mobile messaging service type message includes the identification of the determined location of the mobile station as the requested location information of the mobile station.

Also, in the example, a processor of the positioning server 31 configures the positioning server 31 to perform various functions, including functions to: receive a message from the messaging service server 35; determine the location of the mobile station based on in part the at least some information obtained from the air by the mobile station; and send the identification of the determined location of the mobile station to the messaging service server 35, for transmission of the responsive mobile messaging service type message to the mobile station. The at least some information obtained by the mobile station includes information regarding at least one of a WiFi access point or a cellular base station detected by the mobile station.

The hardware elements, operating systems and programming languages of such servers 31, 35, 37, and 29 are conventional in nature, and are well known. In addition, the server functions may be implemented in a distributed fashion on a number of similar platforms, to distribute the processing load.

FIG. 5 depicts a computer with user interface elements, as may be used to implement a personal computer or other type of work station or terminal device, although the computer of FIG. 5 may also act as a server if appropriately programmed. The structure, programming and general operation of such computer equipment are well known and as a result the drawings should be self-explanatory.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

In the preceding specification, various preferred embodiments have been described with reference to the accompanying drawings. It will, however, be evident that various modifications and changes may be made thereto, and additional embodiments may be implemented, without departing from the broader scope of the claims set forth below. The specification and drawings are accordingly to be regarded in an illustrative rather than restrictive sense.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A mobile station comprising:
   a wireless transceiver for performing a wireless mobile communication voice call through a mobile communication network during which simultaneous voice and data communications are not supported and simultaneous voice communications and mobile messaging service type messages are supported;
   at least one audio user interface device, configured to receive audio input and to output audio during a voice call of the mobile station through the mobile communication network via the wireless transceiver;
   a processor coupled to the wireless transceiver and the at least one audio user interface device;
   a memory accessible by the processor;
   an application program in the memory for the processor, wherein execution of the application program by the processor configures the mobile station to perform at least one function based on location information of the mobile station; and
   programming in the memory for the processor, wherein execution of the programming by the processor configures the mobile station to perform functions, including functions to:
   in response to a query for the location information of the mobile station by the application program, during the voice call, resulting from execution of the application program during the voice call, generate an initial request for the location information of the mobile station, the request including information obtained from the air by wireless reception of radio frequency signals by the mobile station;
   cause the wireless transceiver, in response to the generated initial request for location information of the mobile station, to transmit the generated initial request as a mobile messaging service type message through the mobile communication network during the voice call to a messaging service server;
   receive a responsive mobile messaging service type message through the mobile communication network during the voice call, the responsive mobile messaging service type message including the initially requested location information of the mobile station and including error radius information; and
   in response to the responsive mobile messaging service type message including the requested location information, process the received location information of the mobile station for further execution of the application program.

2. The mobile station of claim 1, wherein the at least some information obtained from the air by wireless reception of radio frequency signals by the mobile station includes information regarding at least one of a WiFi access point or a cellular base station detected by the mobile station.

3. The mobile station of claim 2, wherein the information regarding the cellular base station detected by the mobile station is used for coarse estimation of the location of the mobile station.

4. The mobile station of claim 3, wherein the information regarding the cellular base station detected by the mobile station comprises system identification (SID), network identification (NID), and base station identification (BID).

5. The mobile station of claim 2, wherein the information regarding the WiFi access point detected by the mobile station is used for fine estimation of the location of the mobile station.

6. The mobile station of claim 5, wherein the information regarding the WiFi access point detected by the mobile station comprises media access control (MAC) address of the WiFi access point and signal strength of the WiFi access point at the mobile station.

7. The mobile station of claim 1, wherein each mobile messaging service type message is a Short Messaging Service (SMS) message.

8. The mobile station of claim 1, wherein the mobile communication network is a Code Division Multiple Access (CDMA) network.

9. The mobile station of claim 1, wherein:
the mobile station is configured to obtain its location information with assistance from the mobile communication network, for use by the application program; and
the mobile station is not capable of obtaining its location using an installed Global Positioning System (GPS).

10. A method comprising steps of:
at a messaging service server, receiving from a mobile station, during a mobile communication voice call through a mobile communication network in which simultaneous voice and data communications with the mobile station are not supported, and simultaneous voice communications and mobile messaging service type messages are supported, a mobile messaging service type message including an initial request for location information of the mobile station for utilization by an application program running on the mobile station and information obtained from the air by wireless reception of radio frequency signals by the mobile station, during a voice call of the mobile station through the mobile communication network;
sending information contained in the mobile messaging service type message to a positioning server;
at the positioning server, determining the location of the mobile station based in part on at least some of the information received from the mobile station;
in response to the initial request for location information sent via the mobile messaging service type message for the location information of the mobile station, sending, by the mobile station, identification of the determined location of the mobile station to the messaging service server, for transmission of a responsive mobile messaging service type message to the mobile station; and
sending, to the mobile station, the responsive mobile messaging service type message through the mobile communication network, during the voice call, wherein the responsive mobile messaging service type message includes the identification of the determined location of the mobile station as the requested location information of the mobile station including error radius information for processing during the voice call by the application program running on the mobile station.

11. The method of claim 10, wherein the at least some information obtained from the air by wireless reception of radio frequency signals by the mobile station includes information regarding at least one of a WiFi access point or a cellular base station detected by the mobile station.

12. The method of claim 11, wherein in the determining step of the location of the mobile station by the positioning server, the information regarding the cellular base station detected by the mobile station is used by the positioning server for coarse estimation of the location of the mobile station.

13. The method of claim 11, wherein in the determining step of the location of the mobile station by the positioning server, the information regarding the WiFi access point detected by the mobile station is used by the positioning server for fine estimation of the location of the mobile station.

14. The method of claim 10, wherein the mobile communication network is a Code Division Multiple Access (CDMA) network.

15. The method of claim 10, wherein the mobile messaging service type message is a Short Messaging Service (SMS) message.

16. The method of claim 10, wherein the responsive mobile messaging service type message further includes error radius information.

17. A system comprising:
a mobile communication network in which simultaneous voice and data communications with a mobile station are not supported, and simultaneous voice communications and mobile messaging service type messages are supported;
a messaging service server for receiving and sending mobile messaging service type messages to and from the mobile station through the mobile communication network, wherein the mobile messaging service type messages are utilized during the voice call as a transport bearer between the mobile station and the mobile communication network for determining location of the mobile station by the positioning server; and
a positioning server for determining location of the mobile station based on information received from the mobile station, via the mobile messaging service type messages; and
wherein during a voice call of the mobile station through the mobile communication network, the mobile station is configured to:
in response to a query for location information of the mobile station by an application program running on the mobile station executing during the voice call, send an initial request for the location information of the mobile station to the messaging service server as a mobile messaging service type message, the request including information obtained from the air by wireless reception of radio frequency signals by the mobile station;
receive, from the messaging service server, during the voice call a responsive mobile messaging service type message including information identifying the determined location of the mobile station including error radius information related to the location information; and
in response to the responsive mobile messaging service type message including the requested location information, process the received location information of the mobile station for further execution of the application program.

18. The system of claim 17, wherein the at least some information obtained from the air by wireless reception of radio frequency signals by the mobile station includes information regarding at least one of a WiFi access point or a cellular base station detected by the mobile station by the data transport bundle.

* * * * *